United States Patent [19]
Nakazaki

[11] Patent Number: 6,084,183
[45] Date of Patent: *Jul. 4, 2000

[54] STRUCTURE FOR MOUNTING A SENSING ELEMENT FOR MEASURING THE LOAD OF A VEHICLE

[75] Inventor: Yoji Nakazaki, Shizuoka, Japan

[73] Assignee: Yazaki Corporation, Tokyo, Japan

[ * ] Notice: This patent is subject to a terminal disclaimer.

[21] Appl. No.: 08/882,040

[22] Filed: Jun. 25, 1997

[30] Foreign Application Priority Data

Jun. 28, 1996 [JP] Japan .................................. 8-170133

[51] Int. Cl.⁷ .................................................. G01G 19/08
[52] U.S. Cl. .............................................. 177/136; 73/774
[58] Field of Search ..................................... 177/136, 137, 177/210 R, DIG. 9; 73/774, 768, 815, 841, 855

[56] References Cited

U.S. PATENT DOCUMENTS

| | | | |
|---|---|---|---|
| 4,042,049 | 8/1977 | Reichow et al. | 177/137 |
| 4,095,660 | 6/1978 | Johansson | 177/136 |
| 4,478,091 | 10/1984 | Forrester | 177/136 |
| 4,884,644 | 12/1989 | Reichow . | |
| 4,977,784 | 12/1990 | Eckerle | 177/136 |
| 5,243,146 | 9/1993 | Nishitani | 177/136 |
| 5,456,119 | 10/1995 | Nakazaki et al. | 73/841 |
| 5,681,998 | 10/1997 | Nakazaki et al. | 73/774 |

FOREIGN PATENT DOCUMENTS

| | | |
|---|---|---|
| 0 072 646 | 2/1983 | European Pat. Off. . |
| 44 07 066 | 9/1994 | Germany . |
| 44 08 762 | 12/1994 | Germany . |
| 6-69759 | 9/1994 | Japan .............................. G01G 19/12 |

*Primary Examiner*—Randy W. Gibson
*Attorney, Agent, or Firm*—Sughrue, Mion, Zinn, Macpeak & Seas, PLLC

[57] ABSTRACT

A sensing element mounting structure which can facilitate the mounting of a sensing element into a trunnion shaft. In the sensing element mounting structure, in order that a sensing element for measuring the load of a vehicle can be mounted into the interior portion of a trunnion shaft mounted on a trunnion bracket of the vehicle and extending along the width direction of the vehicle, an insertion hole for storing therein a sensor main body of the sensing element is opened up in such a manner that it extends from one end of the trunnion shaft, which, when the trunnion shaft is mounted on the trunnion bracket, is situated on the outside of the vehicle in the vehicle width direction, toward the other end of the trunnion shaft, so that the insertion and removal of the sensor main body with respect to the interior portion of the insertion hole can be carried out from one end side situated on the outside in the vehicle width direction. At the same time, a through hole is formed in such a manner that it extends through between the insertion hole and the other end of the trunnion shaft, so that a lead wire of the sensing element can be guided through the through hole from the insertion hole and can be pulled out externally of the other end of the trunnion shaft.

9 Claims, 6 Drawing Sheets

STRUCTURE FOR MOUNTING A SENSING ELEMENT FOR MEASURING THE LOAD OF A VEHICLE

BACKGROUND OF THE INVENTION

1. Field of the Invention

This invention relates to a structure for mounting a sensing element for measuring the load of a vehicle into a trunnion shaft which is used to support the suspension of a vehicle such as a truck and the like.

2. Background

The measurement of a load of a vehicle is performed mainly on a large-size vehicle such as a truck and, for example, for the purposes of preventing traffic accidents such as turnover due to overload, and for preventing deterioration of the vehicle and surfaces of the road from being stimulated.

Conventionally, the vehicle load measurement is carried out by placing a vehicle to be measured on a platform scale which is so called "KANKAN" in Japanese. However, since such conventional load measurement requires a facility which has a large-scale and wide installation space, the number of platform scales that can be installed is limited to thereby be unable to measure the loads of many vehicles, and further, the installation costs are high.

In order to avoid the above-mentioned inconveniences, in recent years, there has been supplied a load measuring device which can be carried on a vehicle itself for measurement of the load of the vehicle.

As the above-mentioned conventional load measurement device of an on-board type, for example, as disclosed in Japanese Utility Model Publication No. Hei. 6-69759, there is known a load measurement device structured such that a plurality of sensing elements for load measurement such as a gauge sensor of a torsion type or the like are mounted within trunnion shafts which are respectively disposed in the neighborhood of the two end portions of the axle of a vehicle and are used to support the suspension of the vehicle, and the load of the vehicle is calculated in accordance with the sum of the measured values of all the sensing elements.

Now, description will be given below of the structure of the load measurement device disclosed in the above-mentioned Japanese Utility Model Publication No. Hei. 6-69759 with reference to FIGS. 5 to 7.

Figure 5:
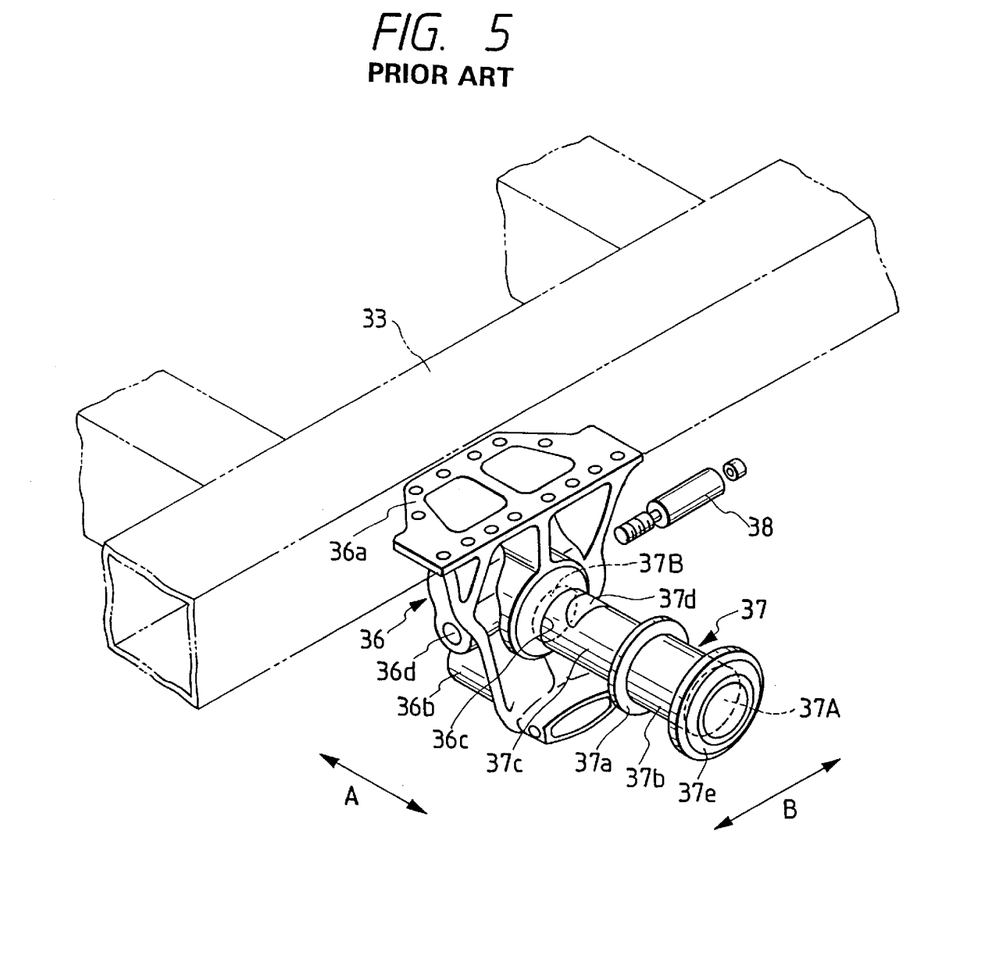
FIG. 5 is a perspective view of a trunnion shaft of a vehicle the load of which is measured by a load measuring device, and a trunnion bracket on which the trunnion shaft can be mounted.

FIG. 5 is a perspective view of the trunnion shaft portion of a vehicle the load of which is to be measured by the load measurement device. In FIG. 5, reference character 37 designates a trunnion shaft, while 36 stands for a trunnion bracket on which the trunnion shaft 37 is to be mounted.

The trunnion bracket 36 includes a flat-plate-shaped flange 36a, and a support portion 36b which is projected from one surface of the flange 36a.

In the support portion 36b, there is formed a through hole 36c extending in parallel to the flange 36a and also, in the portion of the support portion 36b that is situated slightly nearer to the flange portion 36a than the through hole 36c, there is formed a pin hole 36d which extends through the present portion at right angles to the through hole 36c and in parallel to the flange 36a. The pin hole 36d is, within the support portion 36b, in communication with the through hole 36c.

The flange 36a is mounted on and fixed to a load-carrying platform frame 33 of the vehicle by bolts and nuts (not shown) in the following manner: that is, the trunnion bracket 36 faces in such a manner that the through hole 36c extends along the vehicle width direction A of the vehicle and the pin hole 36d extends in the longitudinal direction B of the vehicle, while the opposite surface of the flange 36a to the surface thereof from which the support portion 36b is projected abuts against the lower surface of the load-carrying platform frame 33.

The trunnion shaft 37 is formed in a cylindrical shape which has an outside diameter corresponding to the inside diameter of the through hole 36c and has a length sufficiently larger than the axial dimension of the through hole 36c. Also, the trunnion shaft 37 includes an annular flange 37a which is provided on and projected from the outer peripheral surface of the trunnion shaft 37 in the axially, substantially central portion of the trunnion shaft 37.

Further, in the trunnion shaft 37, a suspension support portion 37b is formed by the trunnion shaft 37 portion that is situated on one end 37A side of the flange portion 37a, while an insertion portion 37c corresponding in length to the through hole 36c is formed by the trunnion shaft 37 portion that is situated on the other end 37B side of the flange 37a.

The above-mentioned insertion portion 37c is structured in the following manner: that is, the insertion portion 37c is inserted into the through hole 36c of the trunnion bracket 36 from outside in the vehicle width direction A toward the central side of the through hole 36c until it abuts against the support portion 36b position in the peripheral edge of the through hole 36c, thereby positioning the one end 37A of the trunnion shaft 37 on the outside in the vehicle width direction A, and positioning the other end 37B on the central side in the vehicle width direction A; and, in this state, at a position where the through hole 36c and pin hole 36d are in communication with each other, as shown by a section in FIG. 7, a fixing bolt 38 inserted into the pin hole 36d can be engaged with a recessed groove 37d having a substantially semicircular section which is formed in the outer peripheral surface of the insertion portion 37c and in the outer peripheral surface portion thereof nearer to the other end 37B of the trunnion shaft 37.

Also, on the above-mentioned suspension support portion 37b, there is mounted an annular spring support member 35 used to support a leaf spring 34 which, with grease applied thereto, can function as the suspension of the vehicle. And, in the portion that extends from one end 37A of the trunnion shaft 37 to the end face of the spring support member 35, in particular, to the position thereof corresponding to the end face portion of the peripheral edge of one end 37A of the trunnion shaft 37, there is removably mounted a cap 37e in order to prevent the grease from leaking out externally from the boundary portion between the outer peripheral surface of the suspension support portion 37b and the inner peripheral surface of the spring support member 35.

Here, description will be given below of a sensing element for vehicle load measurement which is disposed in the interior of the above-structured trunnion shaft 37, with reference to a perspective view thereof shown in FIG. 6.

Figure 6:
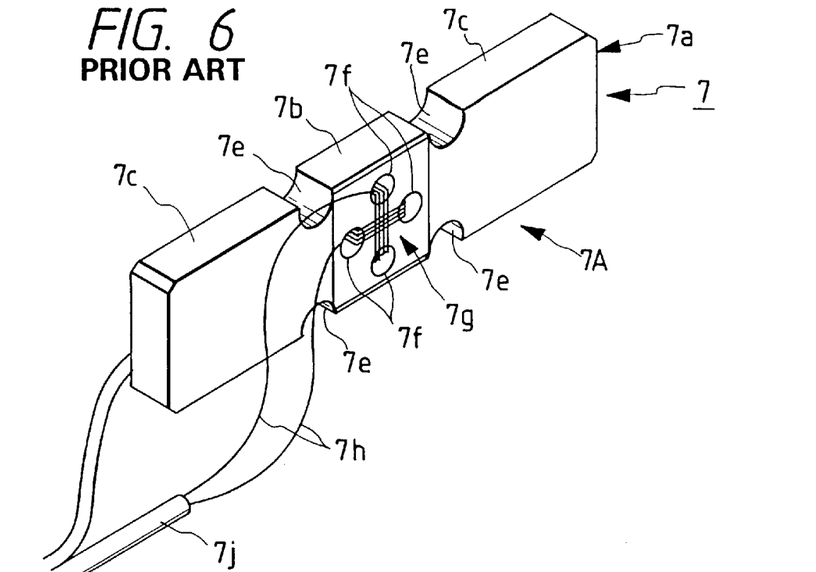
FIG. 6 is a perspective view of a sensing element to be mounted into the trunnion shaft shown in FIG. 5.

In FIG. 6, reference character 7 designates a sensing element, while the present sensing element includes a plate-shaped member 7a and a coil 7g.

The plate-shaped member 7a is formed of magnetic material such as permalloy or the like in a flat shape having a substantially rectangular plan view, while the plate-shaped member 7a includes a coil portion 7b formed in the substantially central portion of the plate-shaped member 7a in the longitudinal direction thereof, and two fixing portions 7c, 7c respectively formed on the two sides of the coil portion 7b.

In a total of four edge positions which are respectively situated in the two edge portions of the plate-shaped member 7a in the width direction thereof extending at right angles to the above-mentioned longitudinal direction and in the boundary portions between the coil portion 7b and two fixing portions 7c and 7c, there are formed four substantially semicircular notches 7e which are respectively used to relieve stresses acting on the plate-shaped member 7a. Also, in the coil portion 7b which is defined inside the four notches 7e, there are formed four through holes 7f which respectively extend through the coil portion 7b in the above-mentioned longitudinal and width directions at intervals.

The coil 7g includes two magnet wires 7h which form a cross coil, while these magnet wires 7h are respectively covered with insulation material (not shown) such as enamel or the like.

One of the two magnet wires 7h is wound over the two through holes 7f and 7f which are disposed opposed to each other in the above-mentioned longitudinal direction, while the two ends of the magnet wire are respectively drawn out from the through holes 7f and 7f. Also, the other magnet wire 7h is wound over the remaining two through holes 7f and 7f which are disposed opposed to each other in the above-mentioned width direction, while the two ends of the magnet wire are respectively drawn out from the through holes 7f and 7f. Further, the two magnet wires 7h are covered with insulation cover films such as vinyl or the like to thereby provide a lead wire 7j.

Now, in the sensing element 7, if current flows one of between the two ends of the magnet wire 7h wound over the two through holes 7f and 7f which are disposed opposed to each other in the longitudinal direction of the plate-shaped member 7a and between the two ends of the magnet 7h wound over the remaining two through holes 7f and 7f which are disposed opposed to each other in the width direction of the plate-shaped member 7a, then there is generated a magnetic field in the plate-shaped member 7a and an induced current is thereby caused to flow between the two ends of the other magnet wire 7h.

In this state, if a load is applied onto the plate-shaped member 7a and the plate-shaped member 7a is thereby distorted along the width direction thereof, then the magnetic field of the plate-shaped member 7a is caused to vary in direction, so that the induced current flowing between the two ends of the other magnet wire 7h is caused to vary.

As a result of this, the current that corresponds in intensity to the load applied onto the plate-shaped member 7a can be obtained from the two ends of the other magnet wire 7h as the output thereof.

By the way, in FIG. 6, reference character 7A designates a sensor main body which has the sensing element 7 portions except for the lead wire 7j.

When the thus structured sensing element 7 is arranged in the interior portion of the trunnion shaft 37, conventionally, there has been employed such a structure as follows, because an amplifier (not shown) used to amplify the output signal of the sensing element 7 is disposed in the bottom portion of the vehicle body situated substantially centrally in the vehicle width direction A.

Figure 7:
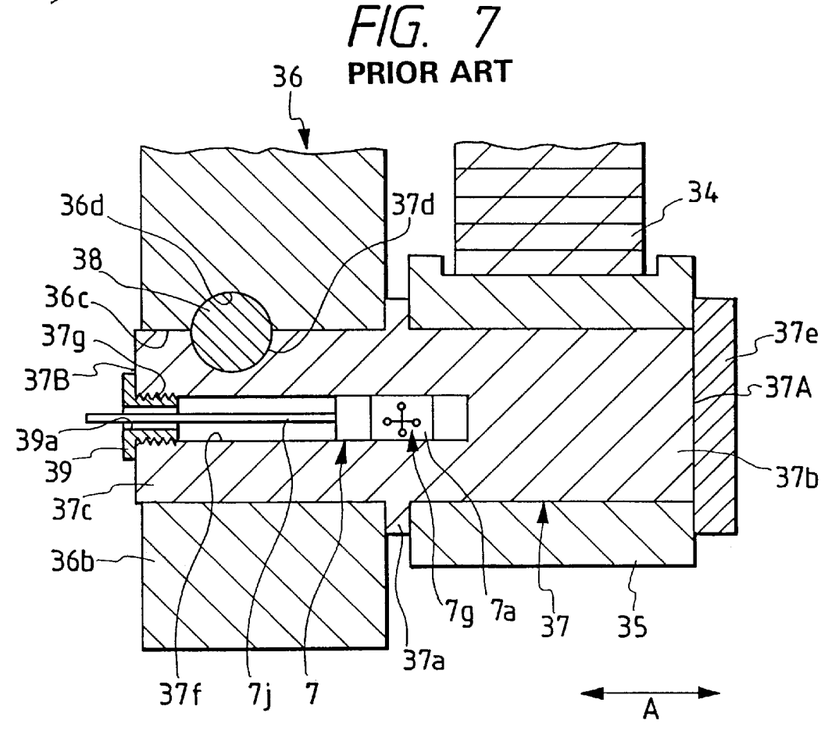
FIG. 7 is a section view of the trunnion shaft portion of a vehicle, illustrating a conventional structure for mounting a sensing element for measuring the load of the vehicle.

That is, as shown in FIG. 7, for easy arrangement or connection of the lead wire 7j with respect to the amplifier, in a state that the lead 7j is inserted into the through hole 36c of the trunnion bracket 36, in the other end 37B of the trunnion shaft 37 situated in the center side of the vehicle in the vehicle width direction A, an insertion hole 37f extending along the axial direction of the trunnion shaft 37 toward the one end 37A side thereof is opened up in such a dimension that the depth of the insertion hole 37f in the axial direction of the trunnion shaft 37 reaches the provision position of the flange 37a, the plate-shaped member 7a, with the lead wire 7j remaining left outside the insertion hole 37f, is inserted into and stored in the deep portion of the insertion hole 37f in such a posture that the width direction of the plate-shaped member 7a extends in the height direction of the vehicle, the cap 38 having a through hole 39a formed in the central portion thereof is threadedly engaged with an internal thread 37g formed in the inner peripheral surface portion of the neighborhood of the entrance of the insertion hole 37f, and the lead wire 7j drawn out externally of the insertion hole 37f from the through hole 39a is connected to the above-mentioned amplifier (not shown).

And, the fixation of the plate-shaped member 7a within the insertion hole 37f is achieved in the following manner: that is, the inside diameter of the insertion hole 37f is set equal to or slightly smaller than the dimension of the plate-shaped member 7a in the width direction thereof, and the plate-shaped member 7a is pressed into the insertion hole 37f.

However, in the mounting structure of the above-mentioned conventional sensing element 7, due to the fact, for easy arrangement of the lead wire 7j, the plate-shaped member 7a is inserted into the insertion hole 37f from the other end 37B of the trunnion shaft 37 situated on the central side of the vehicle, an operator must crawl under the lower side of the vehicle to carry out the insertion operation.

Also, since the plate-shaped member 7a of the sensing element 7 is pressed into and fixed to the insertion hole 37f of the trunnion shaft 37, when the magnet wires 7h or lead wire 7j are out of order, for example, when they are cut, the plate-shaped member 7a cannot be removed from the trunnion shaft 37 due to its fixation to the deep portion of the insertion hole 37f, so that the sensing element 7 cannot be removed individually but it must be removed together with the trunnion shaft 37 for maintenance.

SUMMARY OF THE INVENTION

The present invention aims at eliminating the drawbacks found in the above-mentioned conventional structure for mounting a sensing element for measuring the load of a vehicle. Accordingly, it is a first object of the invention to provide a structure for mounting a sensing element for measuring the load of a vehicle which can facilitate an operation to mount a sensing element into a trunnion shaft. And, it is a second object of the invention to provided a structure for mounting a sensing element for measuring the load of a vehicle which can mount a sensing element within a trunnion shaft firmly and, after then, can surely remove the thus firmly mounted sensing element from the trunnion shaft.

The foregoing objects of the invention has been achieved by the provision of the following structure for mounting a sensing element for measuring the load of a vehicle according to the invention.

In the structure for mounting the sensing element for measuring the load of the vehicle into a trunnion shaft for supporting the suspension of the vehicle according to the invention, the sensing element being arranged to generate an electric signal corresponding to a load applied to the vehicle by the sensor main body thereof and output the thus generated electric signal externally through a lead wire, the trunnion shaft being disposed in the portion of the vehicle nearer to the side portion thereof than the center portion thereof in the vehicle width direction of the vehicle, the structure including: an element storage hole opened up in the trunnion shaft with a given depth in such a manner that it extends along the vehicle width direction from the end portion of the trunnion shaft situated on the lateral side of the vehicle in the vehicle width direction, the element storage hole being capable of storing the sensor main body therein; and, a through hole formed in the trunnion shaft in such a manner that it extends from the end portion of the trunnion shaft situated on the center side of the vehicle in said vehicle width direction to the element storage hole, the through hole prohibiting the sensor main body from passing therethrough but permitting the lead wire to pass therethrough, wherein the sensor main body is stored in the element storage hole, and the lead wire is guided through the through hole from the element storage hole and is pulled out externally of the trunnion shaft from the vehicle center side end portion of the trunnion shaft in the vehicle width direction.

According to the invention, since the element storage hole of the trunnion shaft is opened up from the end portion of the trunnion shaft that is situated on the lateral side of the vehicle in the vehicle width direction, the sensor main body is inserted into the trunnion shaft from the vehicle lateral side in the vehicle width direction not from the vehicle center side. That is, although the sensor main body is stored into the element storage hole of the trunnion shaft from the end portion of the trunnion shaft that is situated on the vehicle lateral side in the vehicle width direction, the lead wire is guided through the through hole of the trunnion shaft and is pulled out from the end portion of the trunnion shaft on the vehicle center side in the vehicle width direction externally of the trunnion shaft, which eliminates the need to arrange or guide the lead wire from the vehicle lateral side end portion of the trunnion shaft in the vehicle width direction through the outside of the trunnion shaft to the vehicle center side of the trunnion shaft in the vehicle width direction.

Therefore, for example, while the arrangement or connection of the lead wire to the amplifier provided in the vehicle body bottom portion situated substantially centrally of the vehicle in the vehicle width direction can be achieved easily from the end portion of the trunnion shaft that is situated on the vehicle center side in the vehicle width direction, the sensing element can be mounted into the trunnion shaft easily.

The structure according to the invention, further including a case member arranged such that the sensor main body can be stored in and fixed to the interior portion of the case member, in which the element storage hole is so formed as to have a dimension which permits the case member to be pressed into and fixed to the interior portion of the element storage hole, and the case member includes, in the portion thereof that is situated nearer to the vehicle lateral side end portion of the trunnion shaft than the sensor main body when the case member is pressed into and fixed to the interior portion of the element storage hole, an engaging portion which, in the interior portion of the element storage hole, can be connected with and removed from a case member inserting and removing jig that can be inserted into the element storage hole.

Further, in the structure according to the invention, the sensing element being arranged to generate an electric signal corresponding to a load applied to the vehicle by the sensor main body thereof and output the thus generated electric signal externally through a lead wire, the trunnion shaft being disposed in the vehicle in such a manner that it extends in the vehicle width direction of the vehicle, the structure including: a case member arranged such that the sensor main body can be stored in and fixed to the interior portion of the case member; and, an element storage hole opened up in the trunnion shaft with a given depth in such a manner that it extends from one end portion of the trunnion shaft in the vehicle width direction, and also that the case member can be pressed into and fixed to the interior portion of the element storage hole, in which the case member includes, in the portion thereof that is situated nearer to the above-mentioned one end portion of the trunnion shaft than the sensor main body when the case member is pressed into and fixed to the interior portion of the element storage hole, an engaging portion which, in the interior portion of the element storage hole, can be connected with and removed from a case member inserting and removing jig that can be inserted into the element storage hole.

According to the invention, in a state that the case member, with the sensor main body stored in and fixed to the interior portion thereof, is pressed into and fixed to the element storage hole of the trunnion shaft, the engaging portion formed in the case member is situated at a position in the element storage hole which is nearer to the entrance of the element storage hole than the sensor main body.

Therefore, when there arises the need to replace the sensing element with a new one due to the failure thereof or the like, it is not necessary to replace, together with the trunnion shaft, the sensing element that is fixed to the element storage hole and is out of direct reach of an operator, but the case member inserting and removing jig may be inserted into the element storage hole with the case member pressed into and fixed to the interior portion thereof and is engaged with the engaging portion of the case member, and then the jig may be pulled out from the element storage hole. As a result of this, the sensing element can be pulled out from the element storage hole of the trunnion shaft and thus can be removed from the trunnion shaft.

Further, in the structure according to the invention, the element storage hole is opened up in the trunnion shaft in a manner to extend from the vehicle lateral side end portion of the trunnion shaft in the vehicle width direction, and the case member portion is situated nearer to the vehicle lateral side end portion of the trunnion shaft than the sensor main body when the case member is pressed into and fixed to the interior portion of the element storage hole.

According to the invention, because the element storage hole of the trunnion shaft is opened up from the end portion of the trunnion shaft that is situated on the lateral side of the vehicle in the vehicle width direction, the sensor main body is inserted into the trunnion shaft not from the vehicle center side in the vehicle width direction but from the vehicle lateral side in the vehicle width direction, which can facilitate the mounting of the sensing element into the trunnion shaft.

Further, in the structure according to the invention, the sensing element includes a lead wire a for outputting externally the electric signal generated by the sensor main body, the case member includes an opening through which, with the sensor main body stored in and fixed to the interior portion of the case member, the lead wire can be pulled out externally of the case member, and, the trunnion shaft includes a through hole which extends from the vehicle center side end portion of the trunnion shaft in the vehicle width direction to the element storage hole and through which the lead wire pulled out from the opening externally of the case member can be pulled out externally of the trunnion shaft.

According to the invention, even when the sensor main body is stored into the element storage hole of the trunnion shaft from the end portion of the trunnion shaft situated on the vehicle lateral side in the vehicle width direction, since the lead wire is guided through the through hole of the trunnion shaft and is pulled out externally of the trunnion shaft from the vehicle center side end portion of the trunnion shaft in the vehicle width direction, there is eliminated the need to guide or arrange the lead wire from the vehicle lateral side end portion of the trunnion shaft in the vehicle width direction through the outside of the trunnion shaft to the vehicle center side of the trunnion shaft in the vehicle width direction. Due to this, for example, the connection of the lead wire to the amplifier provided in the vehicle body bottom portion situated substantially in the central portion of the vehicle in the vehicle width direction can be easily executed from the end portion of the trunnion shaft that is situated in the center side of the vehicle in the vehicle width direction.

Further, in the structure according to the invention, the case member inserting and removing jig includes, in the portion thereof that can be connected with and removed from the engaging portion of the case member pressed into and fixed to the interior portion of the element storage hole, one of an external thread and an internal thread threadedly engageable with the external thread, while the engaging portion of the case member includes the other of the external and internal threads.

According to the invention, the case member and case member inserting and removing jig can be easily connected to and removed from each other by the threaded engagement and removal thereof between the external and internal-threads. In addition to this, when the case member and case member inserting and removing jig are connected with each other and are then inserted into or removed from the element storage hole of the trunnion shaft, the direction to remove the threaded engagement between the external and internal threads is set such that it cannot be identical with the direction of a force to be applied between them, whereby the case member and case member inserting and removing jig cannot be easily removed from each other by the inserting and removing operation of the case member inserting and removing jig with respect to the element storage hole of the trunnion shaft. Thanks to this, the case member with the sensor main body stored in and fixed to the interior portion thereof can be easily and positively inserted into and removed from the element storage hole of the trunnion shaft by use of the case member inserting and removing jig.

Further, in the structure according to the invention, the case member includes, in the portion thereof that can be visually confirmed from outside the trunnion shaft while the case member is pressed into and fixed to the interior portion of the element storage hole, one or more posture confirmation marks for confirming the posture of the sensor main body within the case member.

According to the invention, when the case member with the sensor main body stored in and fixed to the interior portion thereof is pressed into and fixed to the element storage hole of the trunnion shaft, by visually confirming the posture confirmation marks of the case member from outside the trunnion shaft, the sensor main body can be mounted in a correct posture with respect to the trunnion shaft and thus with respect to the vehicle, even if the sensor main body cannot be directly confirmed visually.

DETAILED DESCRIPTION OF THE PREFERRED EMBODIMENTS

Now, description will be given below of the preferred embodiments of a structure for mounting an element for measuring the load of a vehicle according to the invention with reference to the accompanying drawings.

At first, description will be given below of a first embodiment of a structure for mounting an element for measuring the load of a vehicle according to the invention with reference to FIGS. 1, 2a and 2b.

Figure 1:
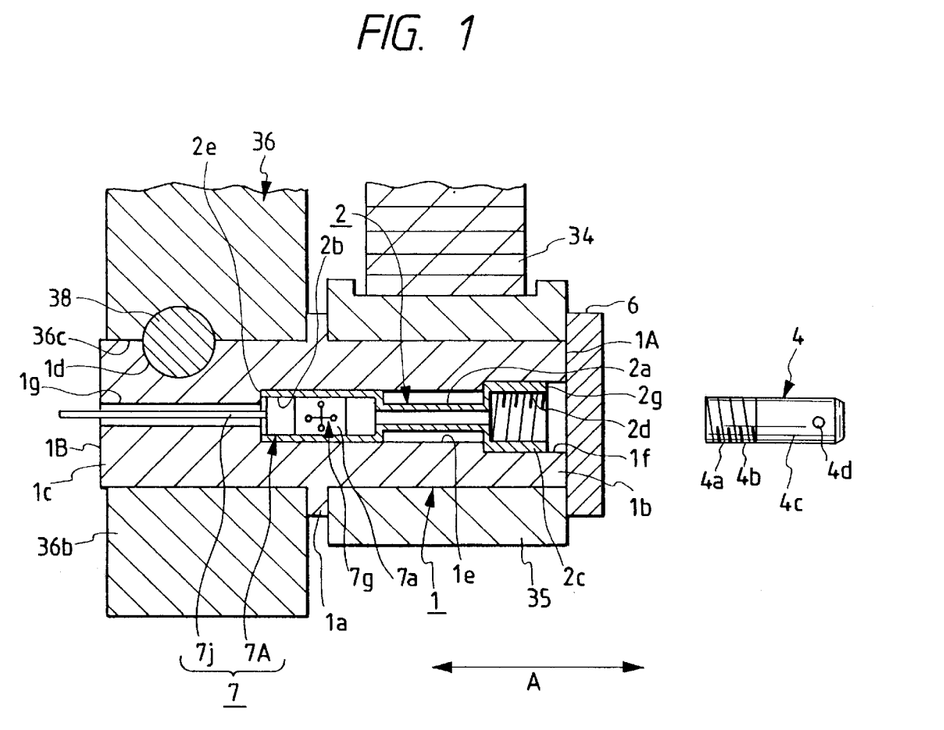
FIG. 1 is a section view of the trunnion shaft portion of a vehicle, illustrating a first embodiment of a structure for mounting a sensing element for measuring the load of the vehicle according to the invention.
Figure 2A:
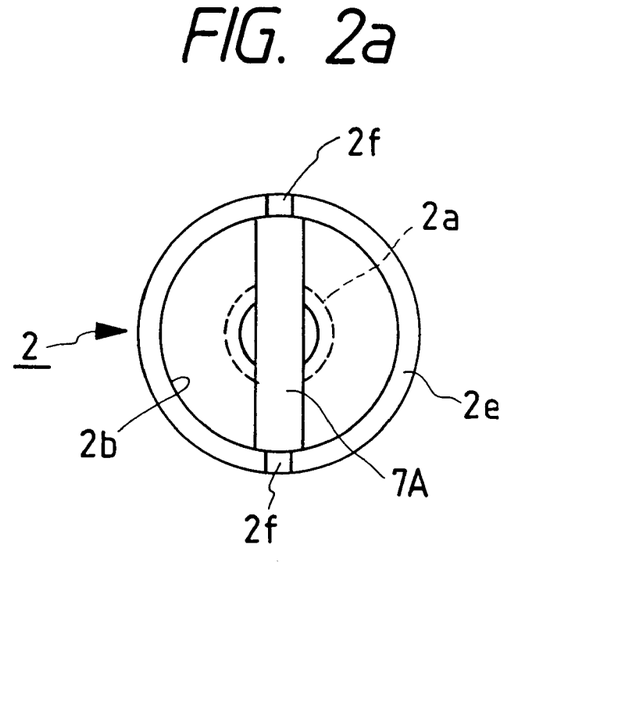
FIG. 2a is a side view of the leading end side of a case member shown in FIG. 1.
Figure 2B:
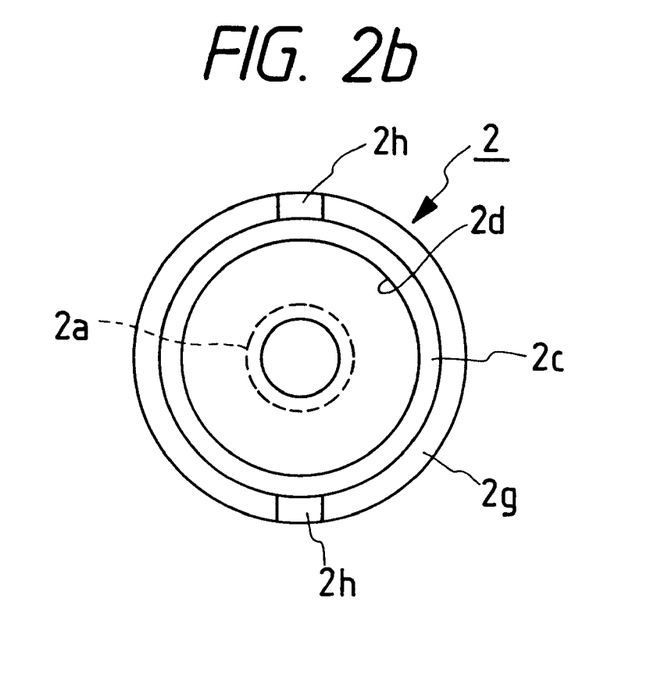
FIG. 2b is a side view of the base end side of the case member.

Now, FIG. 1 is a section view of a trunnion shaft portion of a vehicle, showing a structure for mounting an element for measuring the load of a vehicle according to a first embodiment of the a invention, FIG. 2a is a side view of the leading end side of a case member shown in FIG. 1, and FIG. 2b is a side view of the base end side of the case member shown in FIG. 1. In FIGS. 1, 2a and 2b, the same members and portions thereof as those shown in FIGS. 5 to 7 are given the same designations when they are described below.

And, as shown in FIG. 1, the sensing element mounting structure according to the first embodiment of the invention includes a trunnion shaft 1 to be mounted on a trunnion bracket 36 shown in FIG. 5, and a case member 2 which can be stored into the trunnion shaft 1 in such a manner that the sensor main body 7A of a sensing element 7 shown in FIG. 6 is stored in and fixed to the interior portion of the case member 2.

The trunnion shaft 1 is formed in a cylindrical shape which has an outside diameter corresponding to the inside diameter of a through hole 36c formed in the trunnion bracket 36 and also has a length sufficiently greater than the axial dimension of the through hole 36c. Also, the trunnion shaft 1 includes an annular flange 1a which is provided on and projected from the portion of the outer peripheral surface of the trunnion shaft 1 that is situated substantially centrally in the axial direction of the trunnion shaft 1.

In the trunnion shaft 1, a suspension support portion 1b is formed by the portion of the trunnion shaft 1 that is located on one end 1A side (which corresponds to the end portion of the trunnion shaft on the vehicle lateral side) with respect to the flange portion 1a, while an insertion portion 1c corresponding in length to the through hole 36c is formed by the portion of the trunnion shaft 1 that is situated on the other end 1B side with respect to the flange 1a.

The insertion portion 1c is structured in the following manner: that is, the insertion portion 1c can be inserted into the through hole 36c of the trunnion bracket 36 from the outer side toward the central side in the vehicle width direction A until the flange 1a abuts against the position of a support portion 36b formed in the peripheral edge of the through hole 36c to thereby position one end 1A of the trunnion shaft 1 on the outer side in the vehicle width direction A, and, at a position where the through hole 36c and pin hole 36d are in communication with each other, a fixing bolt 38 inserted through the pin hole 36d can be engaged with a recessed groove 1d having a substantially semicircular section which is formed on the outer peripheral surface of the insertion portion 1c at a position which is near to the other end 1B of the trunnion shaft 1.

Also, on the suspension support portion 1b, there is mounted an annular spring support member 35 for supporting a leaf spring 34 which, with grease applied thereonto, can function as the suspension of the vehicle. Further, in the portion that extends from one end 1A of the trunnion shaft 1 to the end face of the spring support member 35, in particular, the portion of this end face that corresponds to the peripheral edge of one end 1A of the trunnion shaft 1, there is removably mounted a cap 6, in order to prevent the grease from leaking out externally from the boundary portion between the outer peripheral surface of the suspension support portion 1b and the inner peripheral surface of the spring support member 35.

And, in one end 1A of the trunnion shaft 1 which is situated on the outside of the vehicle in the vehicle width direction in a state that the trunnion shaft 1 is inserted into the through hole 36c of the trunnion bracket 36, there is opened up an insertion hole 1e (which corresponds to an element storage hole) which extends along the axial direction of the trunnion shaft 1 toward the other end 1B side of the trunnion shaft 1.

The insertion hole 1e is formed in such a manner that the depth of the insertion hole 1e in the axial direction of the trunnion shaft 1 is so set as to reach the provision position of the flange 1a and the inside diameter of the insertion hole 1e is set larger than the dimension of the plate-shaped member 7a of the sensing element 7 in the width direction thereof. And, the portion of the insertion hole 1e that is situated near to one end 1A of the trunnion shaft 1 is formed such that it has an inside diameter 1f larger than the portion of the insertion hole 1e that is situated deeper than this.

Further, in the trunnion shaft 1, there is formed a through hole 1g which extends coaxially with the insertion hole 1e from the insertion hole 1e to the other end 1B along the axial direction of the trunnion shaft 1. This insertion hole 1g has an inside diameter which is smaller than that of the insertion hole 1e and allows the lead wire 7j of the sensing element 7 to be inserted therethrough.

Now, the case member 2 is formed in a hollow, substantially cylindrical shape and includes a connecting portion 2a as well as a sensor storage portion 2b and an engaging portion 2c which are respectively connected to the two ends of the connecting portion 2a.

The sensor storage portion 2b is formed in such a manner that it has an outside diameter equal to or only slightly larger than the inside diameter of the insertion hole 1e of the trunnion shaft 1 and it also has an inside diameter equal to or slightly larger than the dimension of the plate-shaped member 7a of the sensing element 7 in the width direction thereof, while the dimension of the sensor storage portion 2b in the axial direction of the case member 2 is slightly larger than the dimension of the plate-shaped member 7a in the longitudinal direction thereof.

And, the engaging portion 2c is formed in such a manner that it has an outside diameter equal to or only slightly larger than the inside diameter of the large-diameter portion 1f of the trunnion shaft 1, and the dimension of the engaging portion 2c in the axial direction of the case member 2 is slightly smaller than the dimension of the large-diameter portion 1f in the axial direction of the trunnion shaft 1, while an internal thread 2d is formed on the inner peripheral surface of the engaging portion 2c.

The thus formed case member 2 is structured such that, in a state thereof where it is inserted into the insertion hole 1e of the trunnion shaft 1 from the sensor storage portion 2b side, the leading end face 2e of the case member 2 on the sensor storage portion 2b side functioning as the insertion direction leading end thereof abuts against a stepped portion between the insertion hole 1e and through hole 1g of the trunnion shaft 1, a stepped portion between the connecting portion 2a and engaging portion 2c abuts against a stepped portion between the insertion hole 1e and large-diameter portion 1f of the trunnion shaft 1, and the base end face 2g (which corresponds to the case member portion that can be visually confirmed from outside the trunnion shaft 1) of the case member 2 on the engaging portion 2c side functioning as the insertion direction base end thereof is positioned on the side of the large-diameter portion 1f that is situated internally of one end 1A of the trunnion shaft 1.

Also, on the leading end face 2e of the case member 2, in particular, in the two portions of the leading end face 2e that are shifted 180° out of phase from each other in the peripheral direction of the case member 2, as shown in FIG. 2a, there are provided posture confirmation marks 2f and 2f which are used to confirm the posture (direction) of the plate-shaped member 7a of the sensing element 7 in the peripheral direction of the case member 2 within the sensor storage portion 2b.

Similarly, on the base end face 2g of the case member 2, in particular, in the two portions of the base end face 2g that respectively correspond to the posture confirmation marks 2f and 2f in the peripheral direction of the case member 2, as shown in FIG. 2b, there are provided posture confirmation marks 2h and 2h, respectively.

Here, the above-mentioned respective posture confirmation marks 2f and 2h can be produced by recessing or raising the portions of the marks 2f and 2h with respect to the remaining leading end face 2e portions or base end face 2g portions, or by applying different colors to them from the remaining leading end face 2e portions or base end face 2g portions, or by other similar means.

Also, in the present embodiment, the posture confirmation marks 2h and 2h provided on the base end face 2g as posture confirmation marks, while an opening formed in the sensor storage portion 2b of the case member 2 as an opening through which the lead wire is drawn out externally of the case member.

And, the case member 2 can be inserted into and removed from the insertion hole 1e of the trunnion shaft 1 by use of a jig 4.

The jig 4 is formed in a substantially cylindrical shape which has an outside diameter slightly smaller than the outside diameter of the engaging portion 2c of the case member 2. Also, the jig 4 includes an engaging portion 4a (which corresponds to the jig portion that can be connected with and removed from the engaging portion of the case member) to be engaged with and disengaged from the engaging portion 2c of the case member 2, and an operation portion 4c which is so formed as to extend continuously with the engaging portion 4a.

The engaging portion 4a includes on the outer peripheral surface thereof an external thread 4b which can be threadedly engaged with the internal thread 2d of the engaging portion 2c of the case member 2, while the operation portion 4c includes a through hole 4d which is so formed as to pass through the axis of the jig 4 and extend in the diametrical direction of the jig 4.

Next, description will be given below of the operation of the sensing element mounting structure constructed in the above-mentioned manner according to the first embodiment of the invention.

Firstly, when mounting the sensing element 7 into the trunnion shaft 1, the position of the plate-shaped member 7a in the width direction thereof is matched to the posture confirmation marks 2f and 2f on the leading end face 2e of the case member 2, and the sensor main body 7A is inserted in the longitudinal direction of the plate-shaped member 7a until it abuts against the stepped portion between the sensor storage portion 2b and connecting portion 2a.

And, if the two end faces of the plate-shaped member 7a in the width direction thereof are brought into sliding contact with the inner peripheral surface of the sensor storage portion 2b and the plate-shaped member 7a is abutted against the stepped portion between the connecting portion 2a and sensor storage portion 2b, then the plate-shaped member 7a can be pressed into and fixed to the sensor storage portion 2b.

In this state, the lead wire 7j of the sensing element 7 is drawn out externally from the leading end face 2e of the sensor storage portion 2b, is then inserted into the insertion hole 1e from one end 1A of the trunnion shaft 1 with the cap 6 removed therefrom, and is further drawn out externally from the other end 1B of the trunnion shaft 1 through the through hole 1g.

As a result of this, the leading end of the lead wire 7j is extended out nearer to the center side of the vehicle in the vehicle width direction A than the other end 1B of the trunnion shaft 1. This facilitates the arrangement or connection of the lead wire 7j with respect to an amplifier (not shown) which is disposed in the vehicle body bottom portion situated substantially in the central portion of the vehicle in the vehicle width direction for amplification of the output signal of the sensing element 7.

Also, after the plate-shaped member 7a is pressed into and fixed to the sensor storage portion 2b, simultaneously with the above-mentioned drawing-out operation of the lead wire 7j from the trunnion shaft 1, the external thread 4b of the engaging portion 4a of the jig 4 is threadedly engaged with the internal thread 2d of the engaging portion 2c of the case member 2 to thereby connect the jig 4 to the case member 2.

And, while watching visually the posture confirmation marks 2h and 2h on the base end face 2g of the case member 2 to thereby confirm the posture of the sensor storage portion 2b in the peripheral direction thereof, that is, while confirming that the width direction of the plate-shaped member 7a extends in the height direction of the vehicle, an operator holds the operation portion 4c of the jig 4 by hand and inserts the case member 2 from the sensor storage portion 2b side into the insertion hole 1e of the trunnion shaft 1 until the leading end face 2e abuts against the stepped portion between the insertion hole 1e and through hole 1g and the stepped portion between the connecting portion 2a, and further, the engaging portion 2c abuts against the stepped portion between the insertion hole 1e and large-diameter portion 1f.

In this operation, in order to prevent the lead wire 7j from being caught between the interior portion of the insertion hole 1e and the sensor storage portion 2b of the case member 2, it is preferred that the lead wire 7j is drawn out further externally of the trunnion shaft 1 by an amount in which the case member 2 is inserted into the insertion hole 1e.

Then, if the outer peripheral surface of the sensor storage portion 2b is brought into sliding contact with the inner peripheral surface of the insertion hole 1e, the outer peripheral surface of the engaging portion 2c is brought into sliding contact with the inner peripheral surface of the large-diameter portion 1f, and the leading end face 2e of the case member 2 and also the stepped portion between the connecting portion 2a and engaging portion 2c of the case member 2 are respectively butted against the corresponding portions of the insertion hole 1e of the trunnion shaft 1, then the case member 2, with the sensor main body 7A pressed into and fixed to the interior portion of the sensor storage portion 2b thereof, is pressed into and fixed to the interior portion of the insertion hole 1e of the trunnion shaft 1.

Next, for example, a rod-shaped pin (not shown) is inserted through the through hole 4d of the operation portion 4c of the jig 4, the two ends of the pin are respectively projected out from the through hole 4d, and the jig 4 is rotated counterclockwise by use of this pin or the like.

As a result of this, the case member 2, which is pressed into and fixed to the interior portion of the insertion hole 1e, is prevented against rotation but only the jig 4 is allowed to rotate, thereby being able to remove the threaded engagement between the internal thread 2d of the engaging portion 2c and the external thread 4b of the engaging portion 4a, so that the jig 4 can be removed from the case member 2.

After then, the cap 6 may be mounted onto one end A of the trunnion shaft 1.

This completes the mounting operation to mount the sensing element 7, with the sensor main body 7A thereof stored in the case member 2, into the trunnion shaft 1.

On the other hand, to remove the sensing element 7 mounted in the trunnion shaft 1 from the trunnion shaft 1 because the sensing element 7 is out of order or the like, the engaging portion 4a of the jig 4 may be inserted into the insertion hole 1e from one end 1A of the trunnion shaft 1 with the cap 6 removed therefrom, and the external thread 4b of the engaging portion 4a of the jig 4 may be threadedly engaged with the internal thread 2d of the engaging portion 2c of the case member 2 facing toward one end 1A side in the insertion hole 1e, so that the jig 4 can be connected to the case member 2.

And, while holding by hand the operation portion 4c of the jig 4 or holding by hand the two projecting ends of the above-mentioned pin inserted through the through hole 4d of the operation portion 4c, the jig 4 is pulled externally of one end 1A of the trunnion shaft 1 from the insertion hole 1e of the trunnion shaft 1 along the axial direction of the trunnion shaft 1.

In this operation, if the jig 4 is pulled with a force which is greater than the pressing and fixing force of the case member 2 with respect to the interior portion of the insertion hole 1e of the trunnion shaft 1, then the case member 2 can be pulled out from the insertion hole 1e together with the jig 4. And, if the leading end face 2e of the case member 2 is pulled out to the large-diameter portion 1f, then the sensor main body 7A of the sensing element 7 can be removed from the trunnion shaft 1 together with the case member 2.

Therefore, to repair the defective sensing element 7, after the sensor main body 7A is removed from the sensor storage portion 2b of the case member 2 taken out from the trunnion shaft 1 by use of a tool such as a pair of cutting pliers or the like, the sensing element 7 may be repaired and returned back again to the storage portion 2b or may be replaced with a new one. Or, the old case member 2 may be replaced with a new case member 2 in which the sensor main body 7A is pressed into and fixed to the sensor storage portion 2b thereof. That is, after repaired or replaced, the case member 2 is mounted again within the insertion hole 1e of the trunnion shaft 1 and, finally, the cap 6 is applied onto one end 1A of the trunnion shaft 1.

As described above, in the sensing element mounting structure according to the first embodiment of the invention, in mounting the sensing element 7 for vehicle load measurement within the trunnion shaft 1 mounted on the trunnion bracket 3 of the vehicle and extending along the width direction A of the vehicle, the insertion hole 1e for mounting therein the sensor main body 7A of the sensing element 7 is opened up in the trunnion shaft 1 in such a manner that the insertion hole 1e extends from one end 1A of the trunnion shaft 1 toward the other end 1B thereof, with one end 1A being situated on the outside or in the outside portion of the vehicle in the vehicle width direction A when the trunnion shaft 1 is mounted on the trunnion bracket 36, so that insertion and removal of the sensor main body 7A into and from the interior portion of the insertion hole 1e of the trunnion shaft 1 can be executed from one end 1A side which is situated on the outside of the vehicle in the vehicle width direction A; and, the through hole 1g is formed in such a manner that it extends from the insertion hole 1e to the other end 1B of the trunnion shaft 1, so that the lead wire 7j of the sensing element 7 can be pulled out externally of the other end 1B of the trunnion shaft 1 from the insertion hole 1e through the through hole 1g.

Due to this structure, for example, when the amplifier used to amplify the output signal of the sensing element 7 is disposed in the vehicle body bottom portion situated substantially in the center portion of the vehicle in the vehicle width direction A, the lead wire 7j can be connected to the amplifier easily in such a manner that, in the interior of the trunnion shaft 1, the lead wire 7j is pulled out to the other end 1B side through the through hole 1g and is further pulled out externally of the trunnion shaft 1 from the other end 1B. This eliminates the need that the lead wire 7j is pulled from one end 1A of the trunnion shaft 1 situated on the outside of the vehicle in the vehicle width direction A, is then moved through the outside of the trunnion shaft 1, and is guided to the other end 1B side of the trunnion shaft 1 situated in the central side of the vehicle in the vehicle width direction A. In addition to such facilitated arrangement of the lead wire 7j to the amplifier, an operator can carry out easily the insertion and removal of the sensor main body 7A with respect to the interior portion of the insertion hole 1e of the trunnion shaft 1 at a position situated in the outer portion of the vehicle in the vehicle width direction A, without creeping under the lower portion of the vehicle.

Also, in the sensing element mounting structure according to the first embodiment of the invention, the insertion and removal of the sensor main body 7A with respect to the interior portion of the insertion hole 1e of the trunnion shaft 1 is executed by pressure inserting and fixing the sensor main body 7A to the interior portion of the sensor storage portion 2b of the case member 2 and then by pressure inserting and fixing the case member 2 to the insertion hole 1e of the trunnion shaft 1, so that the sensing element 7 can be mounted in the trunnion shaft 1.

Thanks to this, when there arises the need to replace the sensing element 7 with a new one because it is out of order, not by replacing the sensor main body 7A in the interior portion of the insertion hole 1e out of reach of the operator together with the trunnion shaft 1, but by inserting the engaging portion 4a of the jig 4 into the insertion hole 1e with the case member 2 fixed thereto, bringing the external thread 4b of the engaging portion 4a into threaded engagement with the internal thread 2d of the engaging portion 2c of the case member 2, and then pulling out the jig 4 from the insertion hole 1e externally of one end 1A of the trunnion shaft 1 while holding the operation portion 4c of the jig 4 by hand, the sensor main body 7A can be pulled out from the trunnion shaft 1 and thus the sensing element 7 can be removed from the trunnion shaft 1.

Further, in the sensing element mounting structure according to the first embodiment of the invention, since the connection and disconnection between the case member 2 and the jig 4 can be achieved by the threaded engagement and removal thereof between the internal thread 2d of the engaging portion 2c of the case member 2 and the external thread 4b of the engaging portion 4a of the jig 4, the connection and disconnection between the case member 2 and the jig 4 can be achieved easily. In addition to this, the direction to remove the threaded engagement between the internal thread 2d and external thread 4b can be so set as not to be identical with the direction of the force to be applied between the case member 2 and jig 4 when the case member 2 connected to the jig 4 is inserted into or removed from the insertion hole 1e of the trunnion shaft 1, so that the case member 2 and jig 4 cannot be removed from each other easily by the insertion and removal of the case member 2 with respect to the insertion hole 1e of the trunnion shaft 1. Due to this, the case member 2, with the sensor main body 7A pressed into and fixed to the interior portion thereof, can be inserted into and removed from the insertion hole 1e of the trunnion shaft 1 easily and positively by use of the jig 4.

Still further, in the sensing element mounting structure according to the first embodiment of the invention, the posture confirmation marks 2h and 2h are provided on the base end face 2g of the case member 2 which can be visually confirmed from outside one end 1A of the trunnion shaft 1, where the entrance of the insertion hole 1e is present, in a state that the case member 2 is pressed into and fixed to the insertion hole 1e of the trunnion shaft 1; and, in the peripheral direction of the case member 2, in particular, in the leading end face 2e portions of the case member 2 that correspond to the posture confirmation marks 2h and 2h, there are provided posture confirmation marks 2f and 2f which are respectively used to confirm the posture of the plate-shaped member 7a of the sensing element 7 in the peripheral direction of the case member 2 within the sensor storage portion 2b.

Thanks to this, after the position of the plate-shaped member 7a in the width direction thereof can be matched to the posture confirmation marks 2f and 2f on the leading end face 2e of the case member 2, the sensor main body 7A can be pressed into and fixed to the sensor storage portion 2b along the longitudinal direction of the plate-shaped member 7a. Therefore, when the case member 2 is pressed into and fixed to the insertion hole 1e of the trunnion shaft 1, the posture confirmation marks 2h and 2h on the base end face 2g of the case member 2 can be visually confirmed from outside one end 1A of the trunnion shaft 1. That is, even if the sensor main body 7A cannot be confirmed directly, the sensor main body 7A can be positively mounted into the trunnion shaft 1 and thus into the vehicle in such an accurate posture that the width direction of the plate-shaped member 7a extends in the height direction of the vehicle.

Next, description will be given below of a second embodiment of a structure for mounting a sensing element for measuring the load of a vehicle according to the invention with reference to FIGS. 3, 4a and 4b.

Figure 3:
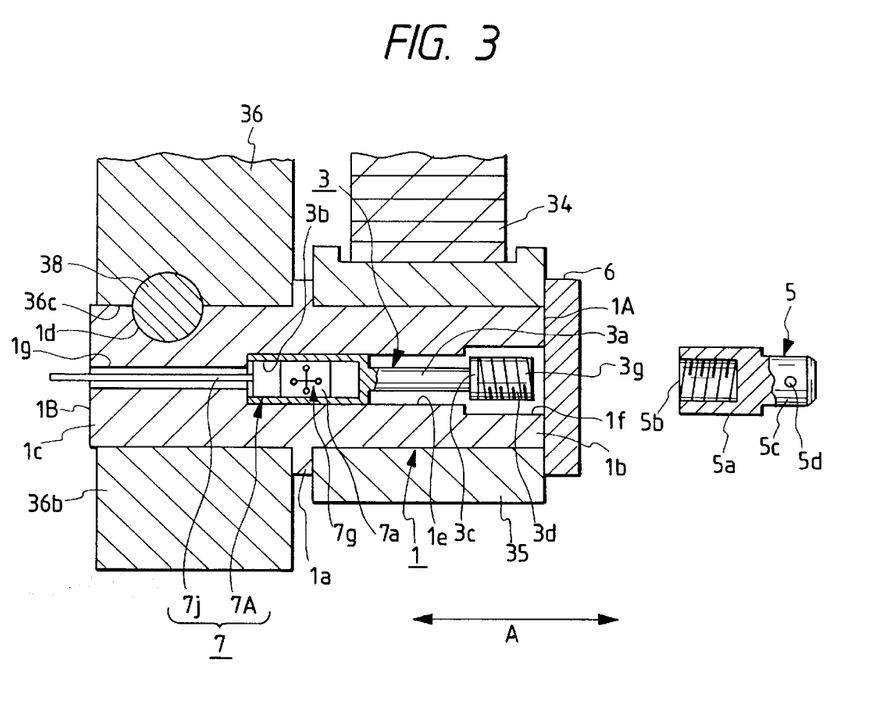
FIG. 3 is a section view of the trunnion shaft portion of a vehicle, illustrating a second embodiment of a structure for mounting a sensing element for measuring the load of the vehicle according to the invention.
Figure 4A:
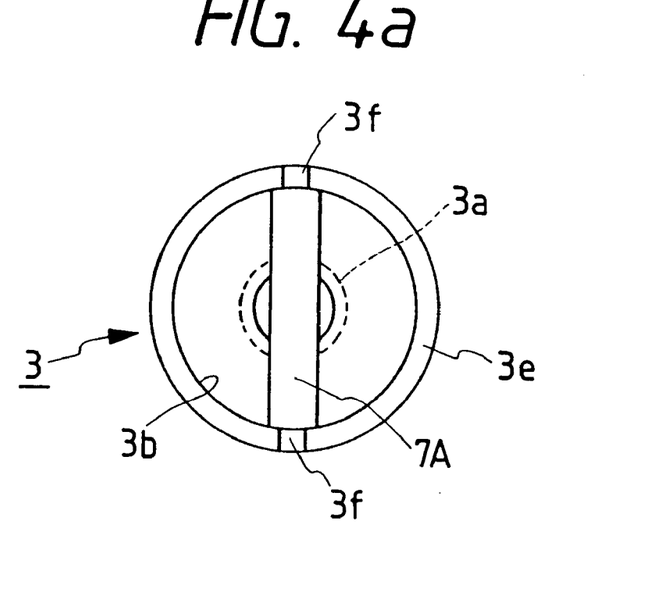
FIG. 4a is a side view of the leading end side of a case member shown in FIG. 3.
Figure 4B:
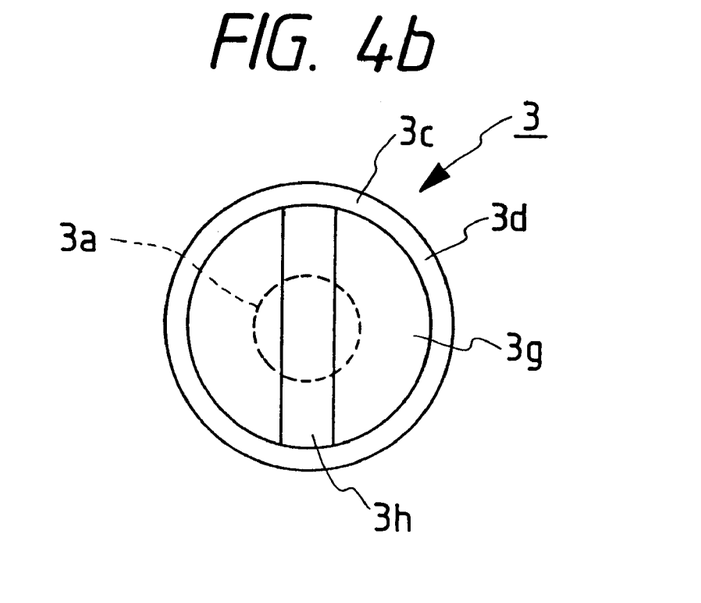
FIG. 4b is a side view of the base end side of the case member.

Now, FIG. 3 is a section view of a trunnion shaft portion of a vehicle, showing a structure for mounting an element for measuring the load of a vehicle according to a second embodiment of the invention, FIG. 4a is a side view of the leading end side of a case member shown in FIG. 3, and FIG. 4b is a side view of the base end side of the case member shown in FIG. 3. In FIGS. 3, 4a and 4b, the same parts and portions thereof as those shown in FIGS. 1, 2a and 2b as well as FIGS. 5 to 7 are given the same designations when they are described below.

And, as shown in FIG. 3, the sensing element mounting structure according to the second embodiment of the invention comprises a trunnion shaft 1 similar to one employed in the first embodiment, and a case member 3 which can be stored within the trunnion shaft 1 with the sensor main body 7A of a sensing element 7 shown in FIG. 7 stored in and fixed to the interior portion of the case member 3.

The case member 3 includes a solid connecting portion 3a having a similar outer shape to the connecting portion 2a of the case member 2 employed in the first embodiment, a sensor storage portion 3b similar to the sensor storage portion 2b of the case member 2 employed in the first embodiment, and an engaging portion 3c different in structure from the engaging portion 2c of the case member 2 employed in the first embodiment. And, in the present embodiment, the dimension of the connecting portion 3a in the axial direction of the case member 3 is set slightly larger than the dimension of the connecting portion 2a in the axial direction of the case member 2 employed in the first embodiment.

The engaging portion 3a is formed in such a manner that the outside diameter thereof is smaller than the inside diameter of the large-diameter portion 1f of the trunnion shaft 1 and larger than the outside diameter of the connecting portion 3a, and the dimension of the engaging portion 3c in the axial direction of the case member 3 is slightly smaller than the dimension of the large diameter portion 1f in the axial direction of the trunnion shaft 1. Also, the engaging portion 3a includes an external thread 3d formed on the outer peripheral surface thereof.

The thus formed case member 3 is structured in the following manner. That is, in a state that it is inserted into the insertion hole 1e of the trunnion shaft 1 from the sensor storage portion 3b side, the leading end face 3e of the case member 3 on the sensor storage portion 3b side which provides the insertion direction leading end thereof abuts against a stepped portion between the insertion hole 1e of the trunnion shaft 1 and through hole 1g, a stepped portion between the connecting portion 3a and engaging portion 3c is situated slightly nearer to one end 1A of the trunnion shaft 1 than a stepped portion between the insertion hole 1e of the trunnion shaft 1 and large-diameter portion 1f, and the base end face 3g (which corresponds to the case member portion that can be visually confirmed from outside the trunnion shaft 1) of the case member 3 on the engaging portion 3c side which provides the insertion direction base end is situated more internally of the large-diameter portion 1f than one end 1A of the trunnion shaft 1.

Also, on the leading end face 3e of the case member 3, in particular, in the leading end face 3e portions that are shifted 180° in phase from each other in the peripheral direction of the case member 3, as shown in FIG. 4a, there are respectively provided posture confirmation marks 3f and 3f which are used to confirm the posture (direction) of the plate-shaped member 7a of the sensing element 7 in the peripheral direction of the case member 3 within the sensor storage portion 3b.

Similarly, on the base end face 3g of the case member 3, in particular, in the base end face 3g portion that corresponds to the posture confirmation marks 3f and 3f in the peripheral direction of the case member 3, as shown in FIG. 4b, there are provided two posture confirmation marks 3h.

Here, the respective posture confirmation marks 3f and 3h, similarly to the posture confirmation marks 2f and 2h employed in the first embodiment, can be produced by recessing or raising the corresponding portions with respect to the other remaining portions of the leading end face 3e, or by coloring them differently from the other remaining portions of the leading end face 3e and base end face 3g.

Also, in the present embodiment, the posture confirmation mark 3h provided on the base end face 3g corresponds to the posture confirmation mark, while the opening of the sensor storage portion 3b of the case member corresponds to the opening through which the lead wire can be pulled out externally of the case member.

And, the insertion and removal operation of the case member 3 into and from the insertion hole 1e of the trunnion shaft 1 is carried out by use of a jig 5.

The jig 5 includes an engaging portion 5a (which corresponds to the jig portion that can be connected with and removed from the engaging portion of the case member) to be engaged with and removed from the engaging portion 3c of the case member 3, and an operation portion 5c which is so formed as to be situated continuously with the engaging portion 5a.

The engaging portion 5a is formed in such a manner that the outside diameter thereof is slightly smaller than the inside diameter of the large-diameter portion 1f of the trunnion shaft 1, and the dimension thereof in the axial direction of the case member 3 is slightly smaller than the dimension of the large-diameter portion 1f in the axial direction of the trunnion shaft 1, while the engaging portion 5a includes an external thread 5d formed on the inner peripheral surface thereof.

The operation portion 5c is formed in a substantially cylindrical shape having an outside diameter slightly smaller than the outside diameter of the engaging portion 2c of the case member 2, while the operation portion 5c includes a through hole 5d which is similar to the through hole 4d formed in the operation portion 4c of the jig 4.

Next, description will be given below of the operation of the above-structured sensing element mounting structure according to the second embodiment of the invention.

At first, when mounting the sensing element 7 into the trunnion shaft 1, the position of the plate-shaped member 7a in the width direction thereof is matched to the posture confirmation mark 3f and 3f on the leading end face 3e of the case member 3, and the sensor main body 7A is then inserted along the longitudinal direction of the plate-shaped member 7a until it abuts against the stepped portion between the sensor storage portion 3b and connecting portion 3a.

In this insertion operation, if the two end faces of the plate-shaped member 7a in the width direction thereof are brought into sliding contact with the inner peripheral surface of the sensor storage portion 2b and the plate-shaped member 7a abuts against the stepped portion between the connecting portion 3a and sensor storage portion 3b, then the plate-shaped member 7a can be pressed into and fixed to the interior portion of the sensor storage portion 3b.

In this state, the lead wire 7j of the sensing element 7 is pulled out externally from the leading end face 3e of the sensor storage portion 3b, is then inserted into the insertion hole 1e from one end 1A of the trunnion shaft 1 with the cap 6 removed therefrom, and is pulled out through the through hole 1g further externally from the other end 1B of the trunnion shaft 1.

As a result of this, the leading end of the lead wire 7j is extended out nearer to the central side of the vehicle in the vehicle width direction A than the other end 1B of the trunnion shaft 1, which can facilitate the connecting operation of the lead wire 7j to an amplifier (not shown) which is disposed in the vehicle body bottom portion situated substantially at the center position of the vehicle in the vehicle width direction A for amplifying the output signal of the sensing element 7.

Also, after the plate-shaped member 7a is pressed into and fixed to the interior portion of the sensor storage portion 3b, simultaneously with the above-mentioned pull-out operation of the lead wire 7j from the trunnion shaft 1, the internal thread 5b of the engaging portion 5a of the jig 5 is brought into threaded engagement with the external thread 3d of the engaging portion 3c of the case member 3, so that the jig 5 can be connected to the case member 3.

And, while watching the posture confirmation mark 3h on the base end face 3g of the case member 3 to thereby confirm the posture of the case member 3 in the peripheral direction as to whether the width direction of the plate-shaped member 7a extends in the height direction of the vehicle, the lead wire 7j is pulled out further externally of the trunnion shaft 1 in such a manner that it cannot be caught between the interior portion of the insertion hole 1e and the sensor storage portion 3b of the case member 3 and, at the same time, while holding the operation portion 5c of the jig 5 by hand, the case member 3 is inserted into the insertion hole 1e of the trunnion shaft 1 from the sensor storage portion 3b side until the leading end face 3e abuts against the stepped portion between the insertion hole 1e and through hole 1g.

As a result of this, if the outer peripheral surface of the sensor storage portion 3b is brought into sliding contact with the inner peripheral surface of the insertion hole 1e, the leading end face 3e of the case member 3 abuts against the stepped portion between the insertion hole 1e of the trunnion shaft 1 and through hole 1g, then the case member 3 with the sensor main body 7A pressed into and fixed to the interior portion of the sensor storage portion 3b is pressed into and fixed to the interior portion of the insertion hole 1e of the trunnion shaft 1.

By the way, in this state, between the outer peripheral surface of the engaging portion 5a of the jig 5 connected to the engaging portion 3c of the case member 3 and inserted into the insertion hole 1e of the trunnion shaft 1, and the inner peripheral surface of the large-diameter portion 1f of the trunnion shaft 1, there exists a slight gap in the diametrical direction of the trunnion shaft 1.

Next, for example, the above-mentioned pin (not shown) is inserted through the through hole 5d of the operation portion 5c of the jig 5 and the two ends of the pin are respectively projected out from the through hole 5d. By using the pin or by other similar means, the jig 5 is rotated counterclockwise.

As a result of this, the case member 3, which is pressed into and fixed to the interior portion of the insertion hole 1e, is prevented against rotation but only the jig 5 can be rotated, thereby being able to remove the threaded engagement between the external thread 3d and internal thread 5b of the respective engaging portions 3c and 5a of the case member 3 and jig 5, so that the jig 5 can be removed from the case member 3.

After then, the cap 6 is mounted onto one end 1A of the trunnion shaft 1.

This completes the mounting operation to mount the sensing element 7, with the sensor main body 7A thereof stored in the case member 3, into the trunnion shaft 1.

On the other hand, to remove the sensing element 7, which is once mounted in the trunnion shaft 1, from the trunnion shaft 1 because the sensing element 7 is out of order or the like, by inserting the engaging portion 5a of the jig 5 into the insertion hole 1e from one end 1A of the trunnion shaft 1 with the cap 6 removed therefrom, the internal thread 5b of the engaging portion 5a of the jig 5 is threadedly engaged with the external thread 3d of the engaging portion 3c of the case member 3 facing toward one end 1A side in the insertion hole 1e, so that the jig 5 can be connected to the case member 3.

And, while holding by hand the operation portion 5c of the jig 5 or holding by hand the two projecting ends of the above-mentioned pin inserted through the through hole 5d of the operation portion 5c, the jig 4 is pulled externally of one end 1A of the trunnion shaft 1 from the insertion hole 1e of the trunnion shaft 1 along the axial direction of the trunnion shaft 1.

In this operation, if the jig 5 is pulled with a force which is greater than the pressing and fixing force of the case member 3 with respect to the interior portion of the insertion hole 1e of the trunnion shaft 1, then the case member 3 can be pulled out from the insertion hole 1e together with the jig 5. And, if the leading end face 3e of the case member 3 is pulled out to the large-diameter portion 1f, then the sensor main body 7A of the sensing element 7 can be removed from the trunnion shaft 1 together with the case member 3.

Therefore, in repairing the sensing element 7, after the sensor main body 7A is removed from the sensor storage portion 3b of the case member 3 taken out from the trunnion shaft 1 by use of a tool such as a pair of cutting pliers or the like, the sensing element 7 may be repaired and returned back again to the storage portion 3b or may be replaced with a new one. Or, the old case member 3 may be replaced with a new case member 3 with a sensor main body 7A of a sensing element 7 pressed into and fixed to the sensor storage portion 3b thereof. That is, after repaired or replaced, the case member 3 is mounted again into interior portion of the insertion hole 1e of the trunnion shaft 1 and, finally, the cap 6 is applied onto one end 1A of the trunnion shaft 1.

As described above, in the sensing element mounting structure according to the second embodiment as well, there can be provided similar effects to the sensing element mounting structure according to the first embodiment.

Here, the structure for arrangement of the lead wire 7j from the insertion hole 1e of the trunnion shaft 1 toward the outside of the other end 1B of the trunnion shaft 1 is not limited to the structures according to the above-mentioned first and second embodiments, in which the lead wire 7j is arranged from the insertion hole 1e to the other end 1B thereof through the through hole 1g formed in the trunnion shaft 1, but, for example, there may be employed a structure in which the lead wire 7j is guided through a through hole, which is so formed in the trunnion shaft 1 as to extend therethrough from the deepest portion of the insertion hole 1e in the diametrical direction of the trunnion shaft 1, and then through the outside of the trunnion shaft 1. With use of this structure as well, the lead wire 7j can be easily arranged to the center side of the vehicle in the vehicle width direction A when compared with the structure in which the lead wire 7j is arranged from one end 1A side of the trunnion shaft 1.

Also, the connection and removal between the engaging portion 2c, 3c of the case member 2, 3 and the engaging portion 4a, 5a of the jig 4, 5 are not limited to the threaded engagement and removal thereof between the internal thread 2, 5b and external thread 4b, 3d as in the above-mentioned first and second embodiments, but any other type of engagement and removal can be used, provided that the direction of the relative movements of the case member 2, 3 and jig 4, 5 with respect to each other when they are engaged with and removed from each other includes other directions than the direction in which the jig 4, 5 is moved toward and apart from the axial direction of the case member 2, 3; for example, with the jig 4 inserted into the case member 2, or with the jig 5 inserted into the case member 3, the jig 4, 5 may be rotated in the peripheral direction of the case member 2, 3 with respect to the case member 2, 3 to thereby bring the engaging claw of one of the case member 2, 3 and jig 4, 5 into engagement with the engaging hole of the other, while the engagement between them may be removed by the reversed operation thereof.

Further, in the sensing element mounting structures according to the above-mentioned first and second embodiments, in order to confirm the posture of the sensor main body 7A stored in the interior portion of the insertion hole 1e of the trunnion shaft 1, there are used the posture confirmation marks 2h, 2h and posture confirmation marks 3h, 3h respectively provided on the base end face 2g, 3g of the case member 2, 3. However, the invention is not limited to this but, for example, if the jig 4, 5 is always situated at a constant position in the peripheral direction of the case member 2, 3 when it is connected with the case member 2, 3, then the position of the through hole 4d, 5d of the operation portion 4c, 5c can be used as the posture confirmation, or an exclusive confirmation mark can be provided on the end face of the operation portion 4c, 5c. That is, a structure for confirming the posture of the sensor main body 7A stored in the interior portion of the insertion hole 1e of the trunnion shaft 1 can be set arbitrarily and, as the case may be, the posture confirmation structure can be omitted.

And, in the above-mentioned first and second embodiments, there are included two structures: that is, in one of them, the insertion hole 1e of the trunnion shaft 1 for storing the sensor main body 7A of the sensing element 7 therein is opened up in a manner to extend from one end face 1A of the trunnion shaft 1 situated on the outside of the vehicle in the vehicle width direction A; and, in the other, the sensor main body 7A of the sensing element 7 is stored into and fixed to the case member 2, 3 and the case member 2, 3 is then pressed into and fixed to the insertion hole 1e of the trunnion shaft 1. However, the invention is not limited to this but, of course, according to the invention, there can also be employed an embodiment which includes only one of the two structures.

What is claimed is:

1. A mounting structure for mounting a sensing element for measuring a load of a vehicle into a trunnion shaft for supporting a suspension of the vehicle, the sensing element generating an electric signal corresponding to a load applied to the vehicle by a sensor main body of the sensing element and outputting the generated electric signal externally through a lead wire, and the trunnion shaft being disposed in a portion of the vehicle nearer to a side portion of the vehicle than to a center portion of the vehicle in a vehicle width direction, the mounting structure comprising:

an element storage hole formed in the trunnion shaft extending along the vehicle width direction from an end portion of the trunnion shaft situated on a lateral side of the vehicle in the vehicle width direction;

a through hole formed in the trunnion shaft and extending from an end portion of the trunnion shaft situated on the center side of the vehicle in the vehicle width direction to the element storage hole for permitting the lead wire of the sensing element to pass therethrough; and a case member for storing the sensor main body in an interior portion of the case member, wherein the element storage hole is formed to have a dimension which permits the case member to be pressed into and fixed to an interior portion of the element storage hole so that the case member containing the sensor main body is stored in the element storage hole, and the lead wire extends through the through hole from the element storage hole and externally projects from the trunnion shaft on the vehicle center side end portion of the trunnion shaft in the vehicle width direction.

2. The structure of claim 1, wherein said case member comprises an engaging portion which is disposed at a portion of the case member that is situated nearer to the vehicle lateral side end portion of the trunnion shaft than the sensor main body when the case member is pressed into and fixed to the interior portion of the element storage hole and which can be connected to a case-member-inserting-and-removing jig in order to insert the case member into and remove the case member from the element storage hole.

3. The structure of claim 1, wherein the case member includes, in a portion thereof that can be visually confirmed from outside the trunnion shaft while the case member is pressed into and fixed to the interior portion of the element storage hole, at least one posture confirmation mark for confirming the posture of the sensor main body within the case member.

4. The structure of claim 1, wherein the case member includes, in a portion thereof that can be visually confirmed from outside the trunnion shaft while the case member is pressed into and fixed to the interior portion of the element storage hole, at least one posture confirmation mark for confirming a posture of the sensor main body within the case member.

5. A structure for mounting a sensing element for measuring a load of a vehicle into a trunnion shaft for supporting a suspension of the vehicle, the sensing element generating an electric signal corresponding to a load applied to the vehicle by a sensor main body of the sensing element and outputting the generated electric signal externally, the trunnion shaft being disposed in the vehicle in such a manner that the trunnion shaft extends in the vehicle width direction of the vehicle, the structure comprising:

a case member for storing the sensor main body in an interior portion of the case member;

an element storage hole formed in the trunnion shaft and extending along the vehicle width direction from one end portion of the trunnion shaft in the vehicle width direction, wherein the case member can be pressed into and fixed to the interior portion of the element storage hole; and an engaging portion formed in a portion of the case member that is nearer to the one end portion of the trunnion shaft than to the sensor main body when the case member is pressed into and fixed to the interior portion of the element storage hole, wherein the engaging portion which, in the interior portion of the element storage hole, can be connected with and removed from a case-member-inserting-and-removing jig that can be inserted into the element storage hole.

6. The structure of claim 5, wherein the element storage hole is formed in the trunnion shaft from the end portion of the trunnion shaft situated on the lateral side of the vehicle in the vehicle width direction, and the portion of the case member is situated nearer to a vehicle lateral side end portion of the trunnion shaft than the sensor main body when the case member is pressed into and fixed to the interior portion of the element storage hole.

7. The structure of claim 6, wherein the sensing element includes a lead wire for outputting externally the electric signal generated by the sensor main body, the case member includes an opening through which, with the sensor main body stored in and fixed to the interior portion of the case member, the lead wire can be pulled out externally of the case member, and, the trunnion shaft includes a through hole which extends from a vehicle center side end portion of the trunnion shaft in the vehicle width direction to the element storage hole and through which the lead wire pulled out from the opening externally of the case member can be pulled out externally of the trunnion shaft.

8. The structure of claim 5, wherein the case-member-inserting-and-removing jig includes, in a portion thereof that can be connected with and removed from the engaging portion of the case member pressed into and fixed to the interior portion of the element storage hole, one of an external thread and an internal thread threadedly engageable with the external thread, while the engaging portion of the case member includes the other of the external and internal threads.

9. The structure of claim 5, wherein the case member includes, in the portion thereof that can be visually confirmed from outside the trunnion shaft while the case member is pressed into and fixed to the interior portion of the element storage hole, at least one posture confirmation mark for confirming the posture of the sensor main body within the case member.

* * * * *